(12) United States Patent
Rago et al.

(10) Patent No.: US 6,895,741 B2
(45) Date of Patent: May 24, 2005

(54) DIFFERENTIAL GEARED TURBINE ENGINE WITH TORQUE MODULATION CAPABILITY

(75) Inventors: Giuseppe Rago, Mississauga (CA); Richard Harvey, Ancaster (CA)

(73) Assignee: Pratt & Whitney Canada Corp., Longueuil (CA)

(*) Notice: Subject to any disclaimer, the term of this patent is extended or adjusted under 35 U.S.C. 154(b) by 76 days.

(21) Appl. No.: 10/600,432

(22) Filed: Jun. 23, 2003

(65) Prior Publication Data

US 2004/0255590 A1 Dec. 23, 2004

(51) Int. Cl.[7] ................................................. F02K 3/02
(52) U.S. Cl. ...................... 60/226.1; 60/772; 60/792; 60/793
(58) Field of Search ........................... 60/226.1, 772, 60/793, 792, 39.22

(56) References Cited

U.S. PATENT DOCUMENTS

| | | | |
|---|---|---|---|
| 2,693,080 A | 11/1954 | Hutchinson | 60/39.28 |
| 3,688,505 A | 9/1972 | Dison | 60/226 R |
| 3,729,957 A | 5/1973 | Petrie et al. | 60/226 R |
| 3,853,432 A | 12/1974 | Cronstedt | 417/405 |
| 3,861,139 A | 1/1975 | Jones | 60/266 R |
| 4,251,987 A | 2/1981 | Adamson | 60/39.75 |
| 4,344,336 A | 8/1982 | Carriere | 74/690 |
| 4,423,794 A | 1/1984 | Beck | 180/165 |
| 4,514,991 A | 5/1985 | Zinsmeyer | 62/209 |
| 4,964,315 A | 10/1990 | Willis, Jr. | 74/665 GA |
| 5,694,765 A | 12/1997 | Hield et al. | 60/39.163 |
| 5,867,979 A * | 2/1999 | Newton et al. | 60/226.1 |
| 6,158,210 A | 12/2000 | Orlando | 60/226.1 |

OTHER PUBLICATIONS

Website Article found at: http://home.earthlink.net/~graham1/MyToyotaPrius/Understanding/ContinuouslyVariable Transmission.htm, Last Edited Oct. 10, 2001; Downloaded /Mar. 9, 2004.

* cited by examiner

*Primary Examiner*—Ehud Gartenberg
(74) *Attorney, Agent, or Firm*—Ogilvy Renault

(57) ABSTRACT

A method and apparatus for controllable distribution of power from a turbine of a gas turbine engine between two rotatable loads of the gas turbine engine, comprises transferring a shaft power of the turbine to the respective rotatable loads using differential gearing operatively coupled with the turbine and the rotatable loads, respectively; and controlling the power transfer using machines operatively coupled with the respective rotatable loads, operable as a generator or a motor for selectively taking power from one of the rotatable loads to drive the other of the rotatable loads, or the reverse.

12 Claims, 2 Drawing Sheets

DIFFERENTIAL GEARED TURBINE ENGINE WITH TORQUE MODULATION CAPABILITY

FIELD OF THE INVENTION

The present invention relates to gas turbine engines, and more particularly, to gas turbine engines in which the power extraction from the compressor and other rotatable loads can be modulated, without affecting turbine operative condition.

BACKGROUND OF THE INVENTION

A gas turbine engine generally includes in serial flow communication, one or more compressors followed in turn by a combustor and high and low pressure turbines disposed about a longitudinal axis centerline within an annular outer casing. During operation, the compressors are driven by the respective turbines and compressor air which is mixed with fuel and ignited in the combustor for generating hot combustion gases. The combustion gases flow downstream through the high and low pressure turbines which extract energy therefrom, for driving the compressors, and for producing other output power either as shaft power or thrust for powering an aircraft in flight. For example, in other rotatable loads, such as a fan rotor in a by-pass turbo fan engine, or propellers in a gas turbine propeller engine, power is extracted from the high and low pressure turbines for driving the respective fan rotor and the propellers.

It is well understood that individual components in operation require different power parameters. For example, the fan rotational speed is limited to a degree by the tip velocity and, since the fan diameter is very large, rotational speed must be very low. The core compressor, on the other hand, because of its much smaller tip diameter, can be driven at a higher rotational speed. Therefore, separator high and low turbines with independent power transmitting devices are necessary for the fan and core compressor in prior art aircraft gas turbine engines. Furthermore since a turbine is most efficient at higher rotational speeds, the lower speed turbine driving the fan requires additional stages to extract the necessary power. These additional stages and the separate power transmitting devices result in weight penalties which are undesirable in aircraft applications.

Efforts have been made to minimize turbine weight of aircraft gas turbine engines by for example, a differential gearing system which distributes power from a single turbine to at least two different components, such as a core compressor and a fan rotor. This is known in the prior art, as described in U.S. Pat. No. 4,251,987, issued to Adamson on Feb. 24, 1981. In a differential geared turbine engine, the compressor, the fan and the turbine are all mechanically linked, and therefore modulating means are necessary to modulate the rotational speed and torque in order to optimize the individual component performances under various engine operation conditions. Various means are available within the existing technology for modulating the torque requirements of various components. Adamson suggests the use of known torque and flow varying techniques, such as variable pitch fans, variable core compressor stators, bleed air extraction, etc., which selectively vary the engine flow passage-defining geometry in order to modulate the torque versus speed characteristics of the individual components. However, a variable engine flow passage-defining geometry increases the complexity and therefore reduces the reliability of an aircraft gas turbine engine.

Use of machines operable as either generators or motors for shaft power transfer in gas turbine engines is known in the art. Hield et al. in their U.S. Pat. No. 5,694,765 which issued Dec. 9, 1997, describe a multi-spool gas turbine engine for an aircraft application, which includes a transmission system operated to transfer power between relatively rotatable engine spools. In a number of embodiments, each shaft is associated with a flow displacement machine operable as a pump or a motor, and in other embodiments, permanent magnet or electromagnetic induction type machines operable as motors or generators, are used. However, Hield et al.'s shaft power transfer system does not offer, disclose or teach differential geared gas turbine engines, because they direct themselves to the transfer shaft power between two independently rotatable (i.e. not differentially-geared) engine spools.

Therefore, it is desirable to provide an aircraft gas turbine engine configuration in which the turbine weight is minimized without compromising the engine flow passage-defining geometry thereof.

SUMMARY OF THE INVENTION

One object of the present invention is to provide a gas turbine engine adapted to modulate engine power distribution between different rotatable loads in order to meet with various engine operation requirements, but without affecting an optimum turbine operation condition.

In accordance with one aspect of the present invention, there is provided a gas turbine engine including a compressor and a turbine in serial fluid communication, a rotatable load, and a differential gearing system for receiving power from the turbine and transmitting power to the respective compressor and the rotatable load. A first motor/generator mechanism is coupled to the compressor for operating either as a motor to drive the compressor, or as a generator to take power from the compressor. A second motor/generator mechanism is coupled to the rotatable load for operating either as a motor to drive the rotatable load, or as a generator to take power from the rotatable load. The first and second motor/generator mechanisms are controlled for selectively modulating the torque versus speed characteristics of the compressor and the rotatable load, and for modulating the rotational speed relationship between the turbine, the compressor and the rotatable load.

In one embodiment of the present invention, the differential gearing system comprises a first sun gear driven by the turbine at turbine rotational speed, and planet gearing engaging the sun gear and operatively connected to the compressor for rotationally driving the compressor at a first output rotational speed with respect to the turbine. A planet carrier is provided for operatively supporting the planet gearing and is rotatable together with the planet gearing. The planet carrier is operatively connected to the rotatable load for driving the rotatable load in a rotational motion at a second output rotational speed with respect to the turbine. The first and second motor/generator mechanisms are preferably permanent magnet motor/generators.

In accordance with another aspect of the present invention there is a method provided for controllably distributing power from a turbine of a gas turbine engine between two rotatable loads of the gas turbine engine, which comprises transferring a shaft power of the turbine to the respective rotatable loads, using differential gearing operatively coupled with the turbine and the rotatable loads, respectively; and controlling the power transfer using machines operatively coupled with the respective compressor and rotatable load, operable as a generator or a motor for selectively taking power from one of the rotatable loads to drive the other of the rotatable loads, or the reverse.

The differential-geared gas turbine engine with motor/generator regulating mechanisms according to the present invention, advantageously provides a high overall efficiency of performance and requires a minimum number of gears, compressor stages and turbine stages. No bleed valves or variable geometry of the engine fluid path is required. Higher speeds are achievable for turbines, compressors and other power output shafts at off-design points which usually occur under take-off conditions.

Other advantages and features of the present invention will be better understood with reference to a preferred embodiment described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENTS

Figure 1:
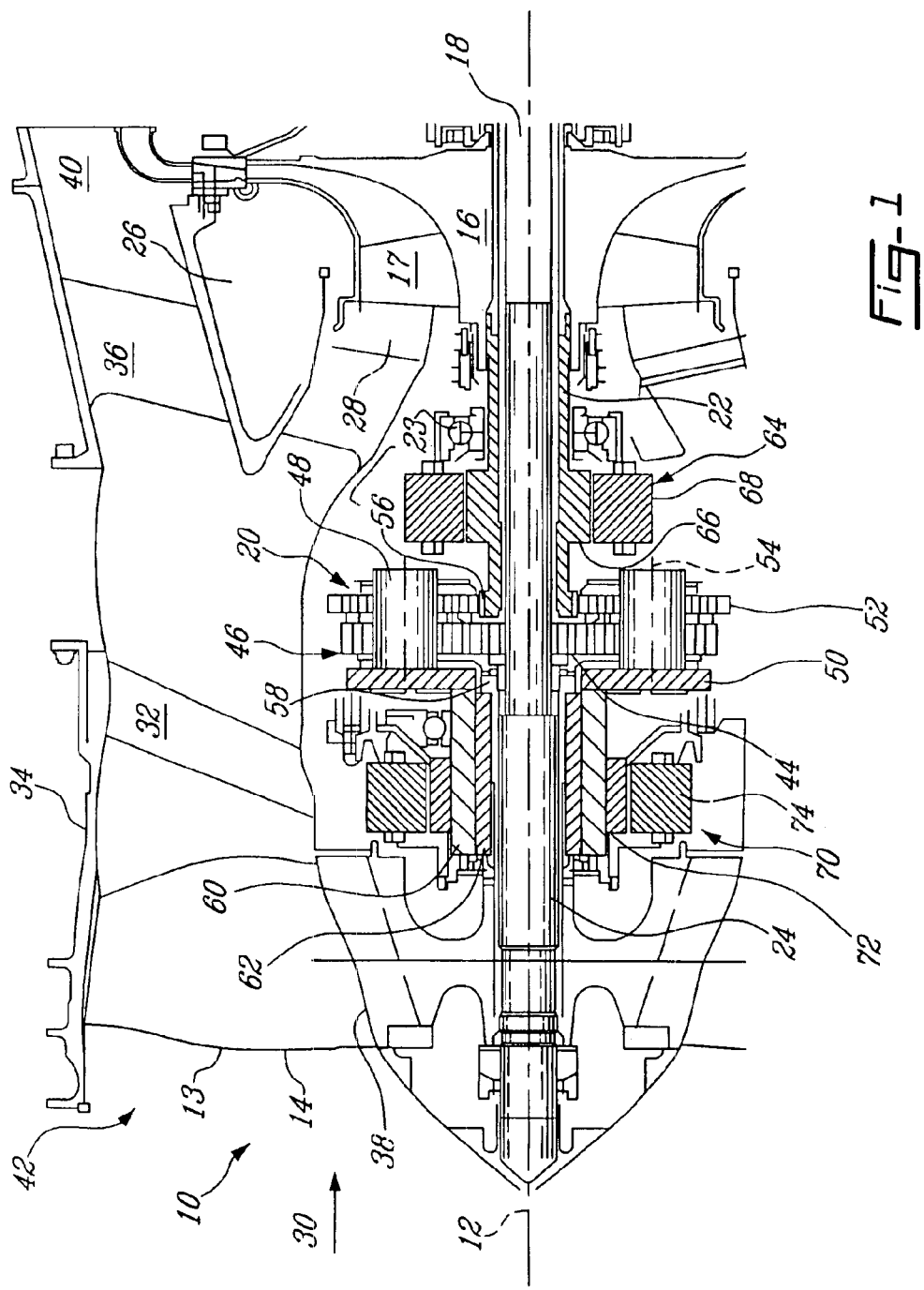
FIG. 1 is a partial cross-sectional view of a portion of a gas turbine engine incorporating one embodiment of the present invention, showing the structural configuration of a differential gearing system and the motor/generator regulating mechanisms.

Referring to the drawings, particularly FIG. 1, an exemplary gas turbine engine 10 includes in serial flow communication about a longitudinal central axis 12, a fan 13 having a plurality of circumferentially spaced apart fan or rotor blades 14, a compressor 16 having a plurality of circumferentially spaced apart compressor blades 17, an annular combustor (not shown), and a turbine (not shown). The turbine includes a rotating shaft 18 extending along the longitudinal central axis 12, and is operatively coupled with a differential gearing system 20. The compressor 16 is coupled to the differential gearing system 20 by a rotor shaft 22 which is rotatably supported by bearing 23 on a stationary structure of the engine 10 and which extends co-axially with respect to the turbine rotating shaft 18. The fan 13 is coupled to the differential gearing system 20 by a rotor shaft 24 extending along the longitudinal central axis 12. Conventional annular combustor (not shown) and fuel injecting means (not shown) are also provided for selectively injecting fuel into the combustor, to generate combustion gases for powering the engine 10.

A conventional annular casing 26 surrounds the engine 10 from the compressor 16 to the turbine, and defines with the compressor 16, a compressor inlet 28 for receiving a portion of ambient air 30. The downstream end of the casing 26 defines an exhaust outlet (not shown). A plurality of stator vanes 32 which are circumferentially spaced apart and are positioned downstream of the fan blades 14 and are provided for supporting the engine 10 within a nacelle 34. A second group of stator vanes 36 which are circumferentially spaced apart and positioned further downstream of the stator vanes 32 are also provided for supporting the engine 10 within the nacelle 34.

A portion of the air 30 compressed by the fan blades 14 adjacent to fan blade roots 38, passes through the stator vanes 32 and 36, and is further compressed by compressor blades 17. The compressed portion of the air 30 is mixed with fuel to generate combustion gases which rotate the turbine and the turbine rotating shaft 18, and are then discharged through the outlet of the casing 26, thereby providing thrust.

The turbine rotating shaft 18 inputs a portion of the engine power to the differential gearing system 20 in order to further distribute this portion of engine power which is required during engine operation, and which will be further described hereinafter.

The nacelle 34 which surrounds the fan blades 14 and at least the upstream portion of the casing 26, is spaced radially outwardly from the casing 26, to define with the casing 26, an annular duct 40 for permitting the radially outer portion of the air 30 compressed by the fan blades 14 to bypass the engine 10. The nacelle 34 includes an inlet 42 at its upstream end for receiving the ambient air 30, and an outlet (not shown) at its downstream end for discharging the portion of air 30 which has been compressed by the fan blades 14 and passes through the annular duct 40, in order to provide a portion of the thrust.

The differential gearing system 20 includes a sun gear 44 affixed to the forward end of the turbine rotating shaft 18 at the turbine speed. A plurality of first planet gears 46 are disposed about and engage the sun gear 44. The first planet gears 46 are each affixed to an associated shaft 48 which is rotatably secured at one end thereof to a carrier disk 50. Second planet gears 52 are each affixed to the associated shaft 48 so that the second planet gears 52 are rotatable together with the corresponding first planet gears 46 and their respective, associated shafts 48. Thus, the first and second gears 46 and 52 surround the longitudinal central axis 12 and the individual pairs of the first and second gears 46, 52 are positioned around the longitudinal axes 54 of the respective associated shafts 48. The second planet gears 52 also surround and engage a gear 56 which is affixed on the forward end of the compressor rotor shaft 22 for transmitting rotary motion and torque to the compressor 16.

Alternatively, each first planet gear 46 can be integrated with the corresponding one of the second planet gears 52 such that each integrated unit of first and second planet gears 46, 52 is rotatably mounted on the corresponding associated shaft 48 which is in turn affixed at one end thereof to the carrier disk 50. This alternative configuration will perform the same function as the planet gear configuration described in the preceding paragraph.

The carrier disk 50 is rotatably supported by a bearing 58 positioned around the turbine rotating shaft 18 at the forward end thereof. Therefore, each pair of the first and second gears 46, 52 are rotatable together about both the longitudinal central axis 12 and the respective longitudinal axes 54 which are in turn rotatable about the longitudinal central axis 12. The carrier disk 50 includes cylindrical section 60 extending axially and forwardly therefrom, which is coaxially coupled with the fan rotor shaft 24 by, for example engaging inner and outer gears or keys 62 disposed therebetween, in order to transmit rotary motion and torque to the fan rotor shaft 24.

It should be noted that the diameters of first and second planet gears 46 and 52 differ, and the relative sizes are a function of the desired gear ratio and therefore provide the desired speed and torque relationship between the compressor rotor 16 and the fan assembly 13.

Thus, in operation, turbine power is transferred through the turbine rotating shaft 18 to rotate sun gear 44, which in turn drives first planet gears 46. As a result of the coupled relationship between the first planet gears 46 and the second planet gears 52, and between the first planet gears 46 and the carrier disk 50, the first planet gears 46 drive the respective second planet gears 52 and the carrier disk 50, which both in turn drive the respective compressor rotor shaft 22 and fan rotor shaft 24 rotationally, but not necessarily at the same speed about the turbine rotating shaft 18.

The differential gear characteristics are well known, that is, $$N_T = k_1 N_F + k_2 N_C$$

where
- $N_T$=turbine speed (RPM)
- $N_F$=fan speed (RPM)
- $N_C$=compressor speed (RPM)
- $k_1$, $k_2$=constants dependent upon the associated gear ratios.

Therefore, fan speed can increase, compromising the compressor speed and vice versa, through equilibrium of the gear elements. The constants $k_1$ and $k_2$ set the torque relationship between the fan 13 and compressor 16. Power is merely the product of the torque and speed, and thus the power ratio between the fan 13 and the compressor 16 can be varied to accommodate any particular operating condition where the total turbine power is known. Therefore, the speed relationship between the fan 13, compressor 16 and the turbine, can be adjusted by modulating the torque versus speed characteristics of either the fan 13 or compressor 16. The torque versus speed relationship will naturally set at values determined by the torque characteristics of the fan 13 and compressor 16. Changes in speed will vary the aerodynamic characteristics of the components. For example, during periods of relatively low aircraft velocity the fan bypass flow rate may be increased at the expense of the core engine by adjusting the torque of the compressor, thereby increasing fan speed and decreasing compressor speed. Conversely, during high speed operation, the torque of the fan may be modulated to decrease the bypass ratio and fan speed, and increase the compressor speed and core engine high velocity exhaust gas flow.

Conventionally, the torque modulation of the fan or compressor has been achieved by varying the geometry of a particular region of the relative fluid path, for example by setting the adjustment of variable compressor stator vanes, or adjusting compressor air bleed valves. According to the embodiment of the present invention shown in FIG. 1, the torque modulation of the fan and compressor is achieved by use of machines operable as motors or as generators.

In FIG. 1 a first machine which is preferably a permanent magnet motor/generator, indicated by numeral 64, includes a permanent magnet rotor 66 and a stator 68.

The permanent magnet rotor 66 is mounted on the compressor rotor shaft 22 and is rotatable together with the compressor rotor shaft 22. The stator 68 has a cylindrical configuration and includes electric windings installed therein. The cylindrical stator 68 is supported within a stationary structure of the engine 10, and surrounds the permanent magnetic rotor 66 in a radially spaced apart but very close relationship therewith. A second machine 70 which is similar to the permanent magnet motor/generator 64 is also provided. The machine 70 has a permanent magnet rotor 72 mounted on the cylindrical section 60 of the carrier disk 50 and is rotatable together with the carrier disk 50. Alternatively, the permanent magnet rotor 72 can also be mounted directly on the fan rotor shaft 24 and be rotatable together therewith. A cylindrical stator 74 which includes electric windings is secured to a stationary structure of the engine 10 and closely surrounds the permanent magnet rotor 72. The electric windings of the respective stators 68 and 74 are electrically connected to a controller which can be a part of the engine or aircraft control system and is therefore not shown in FIG. 1.

In operation, turbine power is input from the turbine rotating shaft 18 into the differential gearing system 20 and is transferred to the respective compressor rotor shaft 22 and fan rotor shaft 24, to meet the respective torque versus. speed characteristic requirements of the fan and the compressor, depending on the gear ratios $k_1$ and $k_2$ which are independent and variable in the design of the engine and are chosen by the designer as a result of due consideration of the projected operating environment and the aerodynamic characteristics of the individual components. When the engine 10 is operated under an off-design points condition, one of the machines 64 and 70 can be controlled to operate as a generator for taking power to produce electric current which is then delivered to the other of the machines 64 and 70, causing it to operate as a motor for driving the shaft coupled therewith. Therefore, the machines 64 and 70 can be controlled for selectively modulating the torque versus speed characteristic of the compressor 16 and the fan 13, and for modulating the rotational speed relationship between the turbine, compressor 16 and the fan 13. The machines 64 and 70 can either or both be advantageously used as electric starters. In such an operation, either or both of the compressor rotor shaft 22 and the fan rotor shaft 24 can be rotated by machines 64 and 70 which in this case receive electrical power and operate as motors to electrically start the engine.

The differential gearing system 20 can be used to distribute turbine power, not only between the compressor and the fan, but also among other rotatable loads of the engine. As an example, the differential gearing system 20 can be used with a gas turbine propeller engine as is schematically illustrated in FIG. 2.

Figure 2:
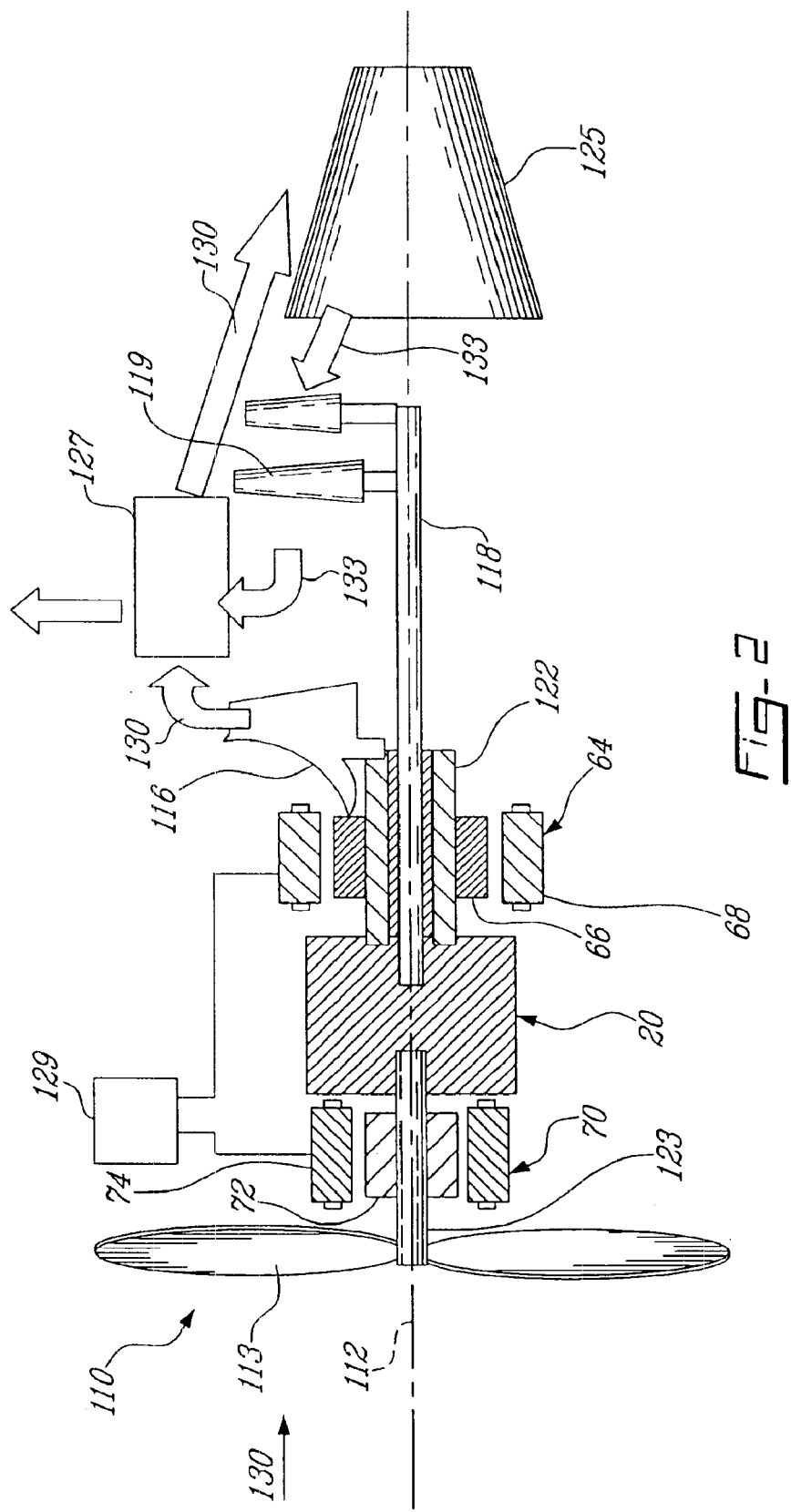
FIG. 2 is a schematic illustration of a gas turbine turbo-propeller engine, illustrating an embodiment of the present invention as applied in different engines.

In FIG. 2 the differential gearing system and the machines operable as motor, generator and starter are similar to their equivalent parts illustrated in FIG. 1, and are indicated by the respective identical numerals. The gas turbine propeller engine which is generally indicated as 110, has a longitudinal central axis 112. The gas turbine propeller engine 110, similarly to gas turbine engine 10 of FIG. 1, includes compressor 116, and turbine 119 which includes two stages as shown in FIG. 2. The turbine 119 is connected to the differential gearing system 20 by turbine rotating shaft 118, and the compressor 116 is connected to the differential gearing system 20 by compressor rotor shaft 122. Both shafts 118 and 122 are operatively supported within the engine 110 and are rotatable about the longitudinal central axis 112. A propeller 113 is provided at the front end of the engine 110 and is coupled to the differential gearing system 20 by a propeller shaft 123, which is operatively mounted within the engine 110 and which is rotatable about the longitudinal central axis 112. The gas turbine propeller engine 110 is also provided with a combustor 125 and fuel injection means (not shown). According to the embodiment shown in FIG. 2, the gas turbine propeller engine 110 is further equipped with a heat recuperator 127.

The permanent magnetic rotor 66 of the machine 64 is mounted on the compressor rotor shaft 122 and is rotatable together with same. The cylindrical stator 68 is secured to a stationary structure of the engine 110, and the electrical windings thereof are electrically connected to a controller 129. The permanent magnet rotor 72 of machine 70 is mounted on the propeller shaft 123 and is rotatable together with same. The cylindrical rotor 74 of machine 70 is secured to a stationary structure of the engine 110, and the electrical windings thereof are electrically connected to the controller 129.

In operation the machines 64 and 70, can either or both be used as electrical starters to electrically start the engine 110. When the engine 110, has started, ambient air 130 entering the engine 110 from the front end thereof is compressed by the compressor 116. The compressed air 130 then passes through the heat recuperator 127 where the compressed air 130 is heated. The heated compressed air 130 then exits the heat recuperator 127 and is mixed with fuel for combustion in a combustor 125, thereby producing combustion gases 133. The combustion gases 133 rotate the turbine 119 to power the engine 110 and then enter the heat recuperator 127 for heat exchange. In the heat recuperator 127 the remaining heat energy carried by combustion gases 133 exhausted from the turbine 119, is transferred to the compressed air 130 therein to increase the compressor air temperature, thereby improves combustion efficiency. Combustion gases 133 are then discharged from the heat recuperator 127 into the surrounding air.

In contrast to the gas turbine engine 10 in FIG. 1, combustion gases 133 generated in gas turbine propeller engine 110 do not directly provide thrust to the aircraft which carries the engine 110. Therefore, combustion gases 133 deliver a substantial amount of power and energy carried thereby, to turbine 119. The turbine power is then distributed by the differential gearing system 20 to the compressor 116, and to the propeller 113 which produces the entire amount of thrust required to fly the aircraft.

The working status of the machines 64 and 70, as a motor or a generator are controlled by the controller 127 according to the different requirements for torque versus speed characteristics of the compressor 116 and the propeller 113, and in order to adjust the speed relationship between the propeller 113, compressor 166 and the turbine 119.

In essence, the advantage of this arrangement according to the present invention, is that the differential gearing ratios can be chosen so that the three shafts rotate, each at the optimum speed for their individual components, and the three components can each be adapted to maintain an optimum speed matching at different power settings. Thus, the turbine can be designed for the most efficient performance without compromising in consideration of compressor or other rotatable load speeds.

The machines operable as a generator or a motor in the embodiments described above are permanent magnet motor/generators. However, other types of machines such as electromagnetic induction motor/generator or hydraulic motor/generator (pump) machines can be alternatively used for this purpose. The gas turbine engine and the gas turbine propeller engine illustrated in FIGS. 1 and 2 are exemplary only, and therefore the present invention can be used with other types of gas turbine engines, for distributing turbine power between various rotatable loads of the engines. Also, though a planetary epicyclic gear system is disclosed, any suitable epicyclic or other type of gear system may be used.

Modifications and improvements to the above-described embodiments of the present invention may become apparent to those skilled in the art. The foregoing description is intended to be exemplary rather than limiting. The scope of the invention is therefore intended to be limited solely by the scope of the appended claims.

We claim:

1. A gas turbine engine comprising:
    a compressor and a turbine in serial fluid communication;
    a rotatable load;
    a differential gearing system for receiving power from the turbine and transmitting power to the compressor and the rotatable load;
    a first motor/generator mechanism coupled to the compressor for operating either as a motor to drive the compressor, or as a generator to take power from the compressor;
    a second motor/generator mechanism coupled to the rotatable load for operating either as a motor to drive the rotatable load, or as a generator to take power from the rotatable load; and
    the first and second motor/generator mechanisms being adapted for selectively modulating the torque versus speed characteristics of the compressor and the rotatable load, and for modulating the rotational speed relationship between the turbine, compressor and the rotatable load.

2. A gas turbine engine according to claim 1, wherein the differential gearing system comprises:
    a first sun gear driven by the turbine at turbine rotational speed;
    epicyclic gearing engaging the first sun gear and operatively connected to the compressor for rotationally driving the compressor at a first output rotational speed with respect to the turbine; and
    an epicyclic carrier for operatively supporting the epicyclic gearing and being rotatable together with the epicyclic gearing, the epicyclic carrier being operatively connected to the rotatable load for driving the rotatable load in rotational motion at a second output rotational speed with respect to the turbine.

3. A gas turbine engine according to claim 2, wherein the epicyclic gearing comprises a plurality of first epicyclic gears engaging the first sun gear, and a plurality of second epicyclic gears co-axially coupled with the respective first epicyclic gears and operatively connected to the compressor.

4. A gas turbine engine according to claim 3, wherein the epicyclic gearing further comprises a second sun gear engaging the second epicyclic gears and being coupled with a compressor shaft for driving the compressor.

5. A gas turbine engine according to claim 2, wherein the epicyclic carrier comprises a cylindrical section co-axially coupled with a rotatable load shaft for driving the rotatable load.

6. A gas turbine engine according to claim 1, wherein the first and second motor/generator mechanisms comprise first and second permanent magnet motor/generators, respectively.

7. A gas turbine engine according to claim 6, wherein the first permanent motor/generator comprises a stator supported on a stationary structure of the engine and a rotor co-axially coupled with a compressor shaft, and the second permanent magnet motor/generator comprises a stator supported on a stationary structure of the engine and a rotor co-axially coupled with either a rotatable load shaft or a cylindrical section of the planet carrier.

8. A gas turbine engine according to claim 7, wherein the stator of each of the first and second permanent magnet motor/generators comprises a winding electrically connected to the controlling means.

9. A method for controllably distributing power from a turbine of a gas turbine engine between two rotatable loads of the gas turbine engine, comprising:
    transferring a shaft power of the turbine to the respective rotatable loads using differential gearing operatively coupled with the turbine and the rotatable loads, respectively; and
    controlling the power transfer using machines operatively coupled with the respective rotatable loads, operable as a generator or a motor for selectively taking power from one of the rotatable loads to drive the other of the rotatable loads, or the reverse.

10. A method according to claim 9, wherein the controlling step comprises:
operating the machine coupled with the compressor as a generator and the machine coupled with the rotatable load as a motor, to increase the rotation speed of the rotatable load.

11. A method according to claim 9, wherein the controlling step comprises:
operating the machine coupled with the compressor as a motor and the machine coupled with the rotatable load as a generator, to increase the rotation speed of the compressor.

12. A gas turbine engine comprising:

a compressor and a turbine in serial fluid communication;

a rotatable load;

a differential gearing system for receiving power from the turbine and transmitting power to the compressor and the rotatable load;

a first power means coupled to the compressor for one of driving the compressor and taking power from the compressor;

a second power means coupled to the rotatable load for one of driving the compressor and taking power from the rotatable load; and the first and second power means being adapted for selectively modulating the torque versus speed characteristics of the compressor and the rotatable load, and for modulating the rotational speed relationship between the turbine, compressor and the rotatable load.

\* \* \* \* \*